United States Patent [19]

Frances

[11] Patent Number: 4,514,541

[45] Date of Patent: Apr. 30, 1985

[54] FIBER CONTAINING PARTICULATE ELASTOMERIC COMPOSITION

[75] Inventor: Arnold Frances, Wilmington, Del.

[73] Assignee: E. I. Du Pont de Nemours and Company, Wilmington, Del.

[21] Appl. No.: 612,751

[22] Filed: May 21, 1984

[51] Int. Cl.$^3$ .............................. C08K 3/36; C08K 3/04
[52] U.S. Cl. ...................... 524/514; 523/138; 524/493; 524/496
[58] Field of Search ............................ 524/514

[56] References Cited

U.S. PATENT DOCUMENTS

| | | | |
|---|---|---|---|
| 3,746,669 | 7/1973 | Dunnom et al. | 524/493 |
| 3,969,568 | 7/1976 | Sperley | 428/297 |
| 4,255,817 | 3/1981 | Helm | 428/213 |

FOREIGN PATENT DOCUMENTS

| | | | |
|---|---|---|---|
| 0020273 | 12/1980 | European Pat. Off. | |
| 58-127761 | 7/1983 | Japan | 524/514 |
| 58-154743 | 9/1983 | Japan | 524/514 |

*Primary Examiner*—Lewis T. Jacobs

[57] ABSTRACT

A particulate elastomeric composition having a density ratio of 0.1 to 0.4 comprising 5–75% by weight of an elastomer, 15–65% by weight of a filler and 10–60% by weight of aramid pulp and a solution process for its preparation. The composition is useful as a masterbatch for the introduction of aramid pulp into elastomeric articles.

16 Claims, No Drawings

FIBER CONTAINING PARTICULATE ELASTOMERIC COMPOSITION

DESCRIPTION

Technical Field

This invention relates to a particulate elastomeric composition suitable as a masterbatch to facilitate the blending of aramid pulp into elastomers. The invention also relates to a solution process for preparing the particulate elastomeric composition.

Reinforcement of elastomers with fibers or fibrous materials is well known. Such fibers or fibrous materials increase the initial modulus of the elastomer containing them and thus increase the resistance of the elastomer to stretch. Uniform blending of fibers and fibrous materials into elastomers can be difficult, especially when relatively large quantities, i.e. >5%, of the fiber or fibrous material is to be blended into the elastomer. This problem is particularly troublesome in the case of high strength, high modulus aramid fibers and pulp because the fibers and pulp are so strong that they are not broken in the mixing operation but rather tend to "ball-up" with consequent nonuniform dispersion throughout the elastomer. Blending of high strength, high modulus aramid fibers and pulp with elastomers in ordinary elastomer processing equipment in the absence of solvent is shown in Japanese Patent Application publication No. 83/154743.

It is known to coat fibrous materials with elastomeric latices followed by coagulation of the latices to provide a mixture of fibrous material and elastomer useful in assisting the dispersion of the fibrous material into the same or another elastomer. Such elastomer-coated fibrous materials are generally in the form of a solid mass of fibers and elastomer which must be cut for further processing. This procedure has not been described using aramid pulp. A disadvantage of the procedure is that only those elastomers available in latex form can be used. Latex coating of fibrous materials is shown in U.S. Pat. Nos. 4,263,184 and 3,836,412.

BRIEF DESCRIPTION OF THE INVENTION

This invention provides a process for making a particulate elastomeric composition having a density ratio of 0.1 to 0.4 exclusive of any organic solvent which may be present by thoroughly mixing 10 to 60 parts of aramid pulp and 15 to 65 parts of a reinforcing filler in a suitable container and then adding a solution of elastomer in an organic solvent with continued stirring, the quantity of solution being sufficient to provide 5 to 75 parts of elastomer, all parts to add up to 100 parts exclusive of organic solvent, the elastomeric particles are removed from the container and, if desired, dried to remove organic solvent. Preferably the solution of elastomer contains 20-30% by weight elastomer. Preferably the aramid pulp is comprised of poly(p-phenylene terephthalamide). Most preferably the aramid pulp has a length of 0.5 to 4.0 mm and an average length of 2 mm. Preferably the elastomer is selected from the group consisting of poly(chloroprene), chlorosulfonated polyethylene, ethylene-propylene-diene rubber, natural rubber, poly(isoprene), styrene-butadiene rubber (SBR), nitrile rubber, ethylene acrylic rubber and fluoroelastomers. The above described process provides a particulate elastomeric composition comprising, exclusive of any organic solvent which may be present, 5-75% by weight of an elastomer, 15-65% by weight of a reinforcing filler and 10-60% by weight of aramid pulp, said composition having a density ratio of 0.1 to 0.4. The particulate elastomeric composition is useful as such or as a masterbatch for the blending of aramid pulp with the same or a different elastomer.

Preferably the composition contains 10-50% by weight elastomer, 30-50% by weight reinforcing filler and 25-50% by weight aramid pulp.

DETAILED DESCRIPTION OF THE INVENTION

By aramid pulp is meant a synthetic pulp made by mechanical shattering of fibers derived from high strength, high modulus aromatic polyamide fibers such as those described in U.S. Pat. Nos. 3,869,429 and 3,869,430. Particularly preferred is aramid pulp derived from poly(p-phenylene terephthalamide) fibers. Aramid pulp is preferably made using pulp refining methods used in the paper industry, e.g., disc refining. The aramid fibers are shattered both transversely and longitudinally to provide fibers having a length of 0.5 to 8 mm, depending on the degree of refinement. Attached to these fibers are fine fibrils which have a diameter as small as 0.1 $\mu$m as compared to a diameter of about 12 $\mu$m for the main (trunk) part of the fiber. The aramid pulp has the appearance of hairy fibers. Aramid pulp has a Canadian Standard Freeness of 300–650 cm$^3$ and a Clark Classification (% on 14 mesh screen) of 5–45%. Preferred for use in the present invention is aramid pulp having a length in the range of 0.5–4 mm and an average length of about 2 mm, a Canadian Standard Freeness of 300–450 cm$^3$ and a Clark Classification of 5–15%. Less preferred, but still useful is longer pulp having a length of 0.5–8 mm and an average length of about 5 mm having a Canadian Standard Freeness of 525–650 cm$^3$ and a Clark Classification of 20–45%.

High strength, high modulus aromatic polyamide fibers are derived from aromatic polyamides whose chain extending bonds are either coaxial or parallel and oppositely directed. Such fibers are described in U.S. Pat. Nos. 3,869,429 and 3,869,430 and may be prepared by the spinning process described in U.S. Pat. No. 3,767,756.

The fillers useful in the present invention are the usual reinforcing fillers useful for compounding into elastomers. For example, the following fillers may be used in the present invention:

"Hi-Sil" 233—a highly structured silica, particle size about 0.02 $\mu$m in diameter. The product has a surface area of 140 m$^2$/g. It is sold by Pittsburgh Plate Glass.

"Sterling NS"—A large particle size, low structure furnace carbon black. Defined by ASTM #N-774.

SRFJ 174—A furnace carbon black similar to "Sterling NS", and defined by ASTM #N-774.

MT-908—A thermal carbon black with low surface and low structure.

"VULCAN" 6H—A very fine particle, medium high structure furnace carbon black. It is a high structure version of Vulcan 6 and is described by ASTM #N-242. The product is sold by Cabot Corporation.

"VULCAN" 7H—A very fine, high structure furnace cabon black from Cabot Corporation. The surface absorption is 125 cm$^3$/100 g.*

HAF N330—A fine particle size, medium structure furnace carbon black from Cabot Corporation. The surface absorption is 103 cm$^3$/100 g.*

"VULCAN" J—A fine particle, medium high structure furnace carbon black. The surface absorption is 114 cm$^3$/100 g.* This carbon black is described by ASTM #N375.

*Surface absorption as measured by ASTM D-2414.

Solvents useful in the process of the present invention are those solvents which will dissolve reasonable quantities, e.g., 20–30% by weight, of the elastomers used. Useful solvents are acetone, toluene, methylethylketone, naphtha and other known solvents for elastomers. The minimum amount of solvent required is that needed to completely dissolve the elastomer. Small amounts of solvent are desirable for formation of smaller particles (which generally are more easily dispersed in further elastomer) and for reasons of economy and safety.

Any elastomer which can be dissolved can be used in the present invention. For example, elastomers useful in the present invention include:

Neoprene FB—A low molecular weight polychloroprene suitable for use as a vulcanizable plasticizer for neoprene and other synthetic elastomers—Du Pont
Neoprene GRT—A sulfur-modified polychloroprene providing retention of building tack and flexibility in uncured stocks—Du Pont
Nordel ® 1040—A sulfur-curable, low viscosity hydrocarbon rubber—Du Pont
"Hycar" 1492P-80 —A butadiene-acrylonitrile copolymer elastomer. This product is sold by B. F. Goodrich.
SBR-1502—A styrene butadiene rubber containing 23.5% styrene and having a Mooney viscosity of 52. The rubber is supplied by Firestone.
Hypalon ® 40—A chlorosulfonated polyethylene—Du Pont
Viton ® A—A fluoroelastomer having good chemical and heat resistance—Du Pont
Viton ® A-35—A low viscosity form of Viton ® available from Du Pont.
30 Viton ® GF—A fluid resistant form of Viton ®.
RSS #1—Natural rubber. Virgin rubber comprised of coagulated rubber sheets which have been properly dried and smoked.
"Diene" 35 NF—A stereospecific, polybutadiene rubber obtained from Firestone. The rubber contains 5% styrene. Mooney viscosity is 47–57.
"Natsyn" 2200—A polyisoprene rubber available from Goodyear. The Mooney viscosity is from 70–90.

Aramid pulp reinforces both polar and nonpolar elastomers. The reinforcing effect, as measured by tensile properties, is greater for the polar elastomers. Incorporation of polar elastomers (typically about 20%) into nonpolar ones signficantly improves the reinforccing effect of pulp.

For example, the incorporation of 10 phr Kevlar ® aramid pulp into 100% Nordel ® 1040 (a nonpolar rubber) increased the modulus at 20% elongation from 158 to 390 psi (1089 to 2689 kPa). Addition of Neoprene FB (a polar rubber) to Nordel ® 1040 to give a 20/80 elastomer blend, while simultaneously adding 10 phr Kevlar ® aramid pulp, gave a much larger increase in modulus to 1420 psi (9791 kPa). (Mixtures of 20/80 Nordel ® 1040/Neoprene FB without pulp have the same modulus as Neoprene FB alone.) All samples contained 40 phr carbon black.

GENERAL PROCEDURE FOR PREPARING THE PARTICULATE ELASTOMERIC COMPOSITION OF THE INVENTION

Kevlar ® aramid pulp (Du Pont) and a typical reinforcing filler such as carbon black or silica are placed in a high speed mixer. The pulp/filler ratio can vary from about 1/6 to 4/1, depending on the requirements of the ultimate, reinforced elastomeric product. The mixer (Eirich RV02 Model 22496 at 3225 rpm chopper blade speed and 71 rpm pan speed, or Littleford Model #FM-310-D at 3600 rpm chopper speed and 155 rpm plow speed) separates the pulp into individual fibers and blends the fibers with the filler.

The mixer is then opened and a solution of elastomer in solvent added. A typical solution consists of 20 parts Neoprene FB (Du Pont) dissolved in 80 parts toleune. The material is mixed at high speed for 4 minutes, and the mixer turned off and opened. The resulting particles may be very fine and fibrous or larger and irregularly shaped (usually 0.2–2.5 cm). The particle size is primarily dependent upon the amount of solvent and/or elastomer used. The less solvent and/or elastomer, the smaller the particle. The particular filler and filler amount also have some effect on particle size. For ease of dispersion, smaller sized particles are preferred.

The particles may be dried to remove excess solvent before use, but complete drying is not necessary prior to compounding.

Air drying at room temperature is satisfactory for small samples. For larger batches, forced warm air or inert gas and/or reduced pressure (with a solvent recovery system) can be used. The particles are now ready for use as such or as a masterbatch for further compounding.

TESTS

Dispersion in Elastomers

To determine the effectiveness of the preblended particles, the particles are compounded with a standard rubber stock (typically Nordel ® 1040) using standard compounding techniques. The particles and rubber stock are mixed using a Banbury mixer followed by a roll mill in which the rolls are operated at different circumferential speeds. An uncured sheet is formed. The sheet is press-cured at 1000–1500 psi (6,900–10,350 kPa) and 320° F. (160° C.) for 30 minutes into a 0.070 in. thick slab, about 6 in. square (15×15×0.18 cm).

The cured slab is visually inspected for undispersed clumps of pulp which stand out as yellow specks (Kevlar ® aramid pulp is yellow in color). A portion of each slab is also cut and torn to inspect the uniformity inside the slab. The resulting reinforced rubber compounds are then classified as excellent, good, fair or poor.

Excellent—Slab looks perfect (equal to control with no fibers). Any fibers visible appear as individual fibers.
Good—Slab looks close to perfect with an occasional small speck of undispersed fiber, but clearly superior to the slab resulting from blending in pulp alone.
Fair—Somewhat worse than "good" but still considerably better than the slab resulting from blending in the pulp alone. The specks of undispersed fiber are more numerous and/or larger than those in a "good" slab.
Poor—The clumps of undispersed fiber are much more numerous and/or much larger in size. These slabs resemble those made by blending in pulp without preblending the pulp into particles.

Physical properties are measured at room temperature, 100° C. and 150° C. In all cases, at least 3 replicates per sample are run. Measurements are by the following methods.

Graves tear (using die C): ASTM D-624-54
Tensile: ASTM D-412-68
Hardness: ASTM D-2240-68

METHOD FOR DETERMINING BULK DENSITY

A weighed amount of particulate material is poured into a round metal cylinder. The cylinder is slightly more than 1 in. (2.54 cm) internal diameter and is 8-7/8 in. (22.5 cm) deep. A piston of exactly 1 in. (2.54 cm) in diameter and weighing 1112.8 g fits inside the cylinder. After pouring a few grams (typically 3 to 25) of particles into the cylinder, the piston is positioned at the top of the cylinder and dropped onto the particles. This process gently compacts the particles to give a more reproducible reading. The piston is dropped a total of twenty times. After the twentieth drop, and with the piston resting on the particles, the compacted volume is read (from the portion of the piston which extends above the top of the cylinder) and the bulk density is calculated in grams/cm$^3$. Reproducibility is about ±10%.

SPECIFIC GRAVITY

Specific gravity may be obtained by the well-known gradient tube method or alternatively by calculation from the known specific gravities of the components making up the particles (dry basis).

The specific gravity of solid elastomers ranges from about 0.8 to 2.0. Kevlar ® aramid pulp has a specific gravity of 1.45. Fillers are 1.8 for carbon black and 2.0 for silica. Thus, the specific gravity for a solid particle of masterbatch containing elastomer, aramid pulp (fiber) and filler would commonly be in the range of 1 to 2. Calculated specific gravities for some representative examples are:

11.1% natural rubber, 44.4% fiber,—1.54 44.4% carbon black
16.7% Nordel ® 2522, 50.0% fiber,—1.53 33.3% silica
26.7% Neoprene FB, 26.7% fiber,—1.64 46.7% silica Density ratio of the particles is calculated by dividing the bulk density by the measured or calculated specific gravity.

EXAMPLE 1

Two hundred grams of Neoprene FB (Du Pont) is dissolved in 800 g toluene. This elastomer solution is placed in a sealed container for later use. An Eirich mixer is charged with 128 g Kevlar ® aramid pulp having a length of 0.5 to 4 mm, average length about 2 mm (Du Pont, Merge 6F 218) and 227 g "Hi-Sil" 233 (a highly structured silica, particle size about 0.02 μm in diameter, sold by Pittsburgh Plate Glass). The mixer is closed and the dry solids blended for about one minute. The machine is shut down, opened, and 640 g of the Neoprene solution described above is added. The mixer is again closed and the mixture blended for about 4 minutes. Irregularly shaped particles are formed. The maximum dimension varies from about 0.31 to 1.16 cm. The particles are air dried overnight in a laboratory fume hood. The particles are satisfactory as a masterbatch for compounding with elastomer on a Banbury mixer or roll mill. After compounding into Nordel ® 1040 to a final Kevlar ® aramid pulp level of 20 phr, the appearance of the cured slab is excellent. Completely dry particles have a density ratio of 0.23.

EXAMPLE 2

A second sample was made in the same manner as Example 1 and compounded into Nordel ® 1040 (a hydrocarbon rubber from Du Pont) to give 35.5 phr silica and 20 phr pulp. Controls were prepared as follows:

2a had no pulp, just filler (and cure agents) blended in; 2b contained virgin pulp which had not gone through the solvent preblending process.

| Compound | Compositions | | |
|---|---|---|---|
| | 2 (invention) | 2a (no pulp) | 2/2b (pulp without preblend) |
| Nordel ® 1040 | 80.0 | 80.0 | 80.0 |
| Neoprene FB | 20.0* | 20.0 | 20.0 |
| "Hi-Sil" 233 | 35.5* | 35.5 | 35.5 |
| Kevlar ® pulp | 20.0* | — | 20.0 |
| Zinc oxide | 5.0 | 5.0 | 5.0 |
| Sulfur | 1.5 | 1.5 | 1.5 |
| MBT[a] | 1.0 | 1.0 | 1.0 |
| "Methyl Tuads"[b] | 0.5 | 0.5 | 0.5 |
| "Butyl Zimate"[c] | 2.0 | 2.0 | 2.0 |

*preblended into masterbatch
[a]2-mercaptobenzothiazole
[b]tetramethylthiuram disulfide (R. T. Vanderbilt)
[c]zinc dibutyldithiocarbamate (R. T. Vanderbilt)

Samples 2 and 2a were run by adding Nordel ® 1040, zinc oxide, and either Neoprene FB and "Hi-Sil" 233 (sample 2a), or preblended particles (sample 2) to a Banbury mixer. The mixer is run at second speed (~60 rpm) until the temperature reaches 200° F. (93° C.). The mixer is shut down, opened, and the dry ingredients which may have escaped from the mixing section of the mixer are brushed down into the mixing section. The mixer is closed, restarted, and run until the temperature of the mixture reaches 240° F. (116° C.). The mixer is shut off and the dry mixture removed. The dry mixture from the Banbury is placed on a roll mill and the remaining dry ingredients added slowly. Milling is continued until the remaining dry ingredients are uniformly blended. The compounded rubber sheet is slit and removed from the roll, cut to size, and cured for 30 minutes at 320° F. (160° C.) at 1000-1500 psi (6,900-10,350 kPa). The cured slab was 4×6×0.070 in (10×15×0.18 cm).

Sample 2b was similarly prepared except that the Banbury was started at fourth speed (~100 rpm), Kevlar ® pulp was added and the mixer run for one minute, silica and zinc oxide added, and the mixer run for two more minutes. Mixer speed was dropped to second speed (~60 rpm), elastomers added, the mixture brushed down at 200° F. (93° C.) as before, and the mixer restarted and run to a mixture temperature of 240° F. (116° C.).

Results are shown in Table I. The invention clearly raises the modulus, decreases the elongation, and improves visual appearance of the compounded elastomer.

TABLE I[4]

| | Sample | | |
|---|---|---|---|
| | 2 | 2a | 2b |
| Appearance | excellent | excellent | poor |
| Graves Tear[2] | | | |
| RT[1] | 237(4232) | 170(3036) | 265(4732) |

TABLE I-continued

| | Sample | | |
|---|---|---|---|
| | 2 | 2a | 2b |
| 150° C. Modulus[3] | 115(2054) | 60(1071) | 118(2107) |
| RT | 776(54.6) | 127(8.93) | 477(31.4) |
| 150° C. | 880(61.9) | 123(8.6) | 543(38.2) |
| Tensile Strength, lb/in$^2$ (kg/cm$^2$) | | | |
| RT | 1533(109) | 1992(140) | 1320(92.8) |
| 150° C. | 1130(79.4) | 483(34.0) | 1043(73.3) |
| Breaking Elongation, % | | | |
| RT | 25 | 483 | 35 |
| 150° C. | 15 | 169 | 22 |
| Hardness[5] | | | |
| RT | 86 | 72 | 87 |
| 150° C. | 75 | 53 | 73 |

NOTES
[1]RT is room temperature
[2]Using die C. Measurements are in lbs/linear inch (kg/m). Tear is across the direction of fiber orientation.
[3]Stress in psi at 10% Elongation (kg/cm$^2$)
[4]Tensile properties are measured in the machine direction. The trend of properties in the cross-machine direction is similar, but the effect is smaller because of preferential orientation of the fibers in the machine direction during milling.
[5]Hardness is measured perpendicular to the plane of fiber orientation and is in Shore "A" units.

EXAMPLE 3

This example documents the effect on dispersibility in rubber when short staple fibers (0.79–12.7 mm) are substituted for aramid pulp. Examples 3-A through 3-K reproduce Example 1 in every way except for substituting the staple fibers indicated in Table II for the pulped fibers of Example 1. None of the staple fibers yielded satisfactory dispersibility, but the shortest staple fibers (Examples 3-A) were best. Examples 3-L through 3-N used different quantities of the same materials as in Example 3-B to investigate the effect of concentration of staple fiber in the masterbatch. The particles of Example 3-L were 10% fiber (33.3% rubber; 56.7% filler). Example 3-M was 50% fiber (18.5% rubber; 31.5% filler). Example 3-N was 75% fiber (9.2% rubber; 15.8% filler). It is clear that dispersibility improves as the weight percentage of staple fibers in the masterbatch particles is reduced. At as low as 10% staple fibers in the masterbatch, however, only fair dispersibility resulted.

TABLE II

STAPLE FIBERS

| Example | Polymer | dtex per fiber | Length (mm) | Dispersibility Rating |
|---|---|---|---|---|
| 3-A | PPD-T* | 1.67 | 0.79 | fair— |
| -B | PPD-T* | 1.67 | 1.59 | poor |
| -C | PPD-T* | 1.67 | 3.18 | poor |
| -D | PPD-T* | 1.67 | 6.35 | poor |
| -E | PPD-T* | 1.67 | 12.7 | poor |
| -F | MPD-I** | 1.67 | 3.18 | poor |
| -G | MPD-I** | 1.67 | 6.35 | poor |
| -H | 2G-T*** | 1.67 | 3.18 | poor+ |
| -I | 2G-T*** | 1.67 | 6.35 | poor |
| -J | 2G-T*** | 6.67 | 6.35 | poor |
| -K | nylon 66 | 1.67 | 6.35 | poor+ |
| -L | PPD-T* | 1.67 | 1.59 | fair |
| -M | PPD-T* | 1.67 | 1.59 | poor |
| -N | PPD-T* | 1.67 | 1.59 | poor |

*PPD-T is poly(p-phenylene terephthalamide)
**MPD-I is poly(m-phenylene isophthalamide)
***2G-T is poly(ethylene terephthalate)

EXAMPLE 4

A natural rubber-containing sample is prepared by the procedure of Example 2. The ingredients are:
200 g Kevlar ® pulp
200 g N-375 carbon black
200 g of solution prepared by dissolving 25 parts RSS #1 grade natural rubber in 75 parts toluene.

The resulting particles are fibrous and have a density ratio of 0.21. When compounded into additional RSS #1 rubber and cured, the slabs have an excellent appearance.

EXAMPLE 5

Additional particulate compositions are prepared according to the general procedure given previously. The compositions are shown in Table 3. Average pulp length was 5 mm for samples 5-L and 5-M, 2 mm for all others. Samples 5-A through 5-D show the effect of elastomer level. Samples 5-E and 5-F explore the range of pulp levels. 5-G through 5-K describe elastomer blends. Samples 5-L and 5-M show the use of longer pulp. Samples 5-N to 5-P show that improved dispersibility results from the use of smaller amounts of solvent. Particle size also decreases as the amount of solvent is reduced. Samples 5-Q through 5-Y show additional elastomers and fillers.

TABLE 3

| | Solution | | | | | Particle Composition, % | | | | Dispersibility |
|---|---|---|---|---|---|---|---|---|---|---|
| Example | Solvent | (pts) | Elastomer | (pts) | Filler | Elastomer | Pulp | Filler | Density Ratio | Rating |
| 5-A | toluene | (80) | Neoprene FB | (20) | "Hi-Sil" 233 | 26.5 | 26.5 | 47.0 | 0.23 | excellent |
| B | toluene | (80) | Neoprene FB | (20) | "Hi-Sil" 233 | 5.0 | 35.1 | 60.0 | 0.19 | good |
| C | toluene | (80) | Neoprene FB | (20) | "Hi-Sil" 233 | 10.0 | 33.3 | 56.7 | 0.20 | good |
| D | toluene | (80) | Neoprene FB | (20) | "Hi-Sil" 233 | 50.0 | 18.5 | 31.5 | 0.25 | excellent |
| E | toluene | (80) | Neoprene FB | (20) | "Hi-Sil" 233 | 33.3 | 10.0 | 56.7 | 0.22 | good |
| F | toluene | (80) | "Natsyn" 2200 | (20) | "Hi-Sil" 233 | 12.5 | 50.0 | 37.5 | N.A. | excellent |
| G | toluene | (80) | Neoprene FB SBR 1052 | (2) (18) | "Hi-Sil" 233 | 26.5 | 26.5 | 47.0 | 0.21 | excellent |
| H | toluene | (80) | Neoprene FB Hypalon ® 40 | (18) (2) | "Hi-Sil" 233 | 26.5 | 26.5 | 47.0 | 0.23 | excellent |
| I | toluene | (80) | Neoprene FB SBR 1052 | (10) (10) | "Hi-Sil" 233 | 26.5 | 26.5 | 47.0 | 0.20 | excellent |
| J | toluene | (80) | Neoprene FB SBR 1052 | (10) (10) | "Hi-Sil" 233 | 33.3 | 10.0 | 56.7 | 0.19 | excellent |
| K | toluene | (80) | Neoprene FB Hypalon ® 40 | (10) (10) | "Hi-Sil" 233 | 33.3 | 10.0 | 56.7 | 0.18 | excellent |
| L | toluene | (80) | Neoprene FB | (20) | "Hi-Sil" 233 | 26.5 | 26.5 | 47.0 | 0.24 | excellent |
| M | toluene | (80) | Neoprene FB | (20) | "Hi-Sil" 233 | 33.3 | 10.0 | 56.7 | 0.23 | excellent |
| N | toluene | (90) | Neoprene GRT | (10) | SRFJ 174 | 27.0 | 27.0 | 46.0 | 0.22 | poor |
| O | toluene | (80) | Neoprene GRT | (20) | SRFJ 174 | 27.0 | 27.0 | 46.0 | 0.26 | poor |
| P | toluene | (70) | Neoprene GRT | (30) | SRFJ 174 | 27.0 | 27.0 | 46.0 | 0.21 | excellent |

TABLE 3-continued

| Example | Solution Solvent | (pts) | Elastomer | (pts) | Filler | Particle Composition, % Elastomer | Pulp | Filler | Density Ratio | Dispersibility Rating |
|---|---|---|---|---|---|---|---|---|---|---|
| Q | toluene | (80) | RSS #1 | (20) | HAF-N330 | 26.5 | 26.5 | 47.0 | N.A. | good |
| R | toluene | (75) | RSS #1 | (25) | HAF-N330 | 6.5 | 34.6 | 58.9 | 0.21 | excellent |
| S | toluene | (75) | RSS #1 | (25) | HAF-N330 | 11.2 | 44.4 | 44.4 | 0.19 | excellent |
| T | toluene | (80) | SBR-1502 | (20) | "Vulcan" 7H | 20.0 | 30.0 | 50.0 | N.A. | excellent |
| U | toluene | (80) | SBR-1502 | (20) | "Vulcan" 7H | 30.0 | 45.0 | 25.0 | N.A. | excellent |
| V | toluene | (75) | SBR-1502 | (25) | "Vulcan" 7H | 7.0 | 35.0 | 58.0 | N.A. | excellent |
| W | toluene | (77) | Hypalon ® 40 | (23) | N-744 carbon black | 26.6 | 27.1 | 46.3 | N.A. | excellent |
| X | methylethyl-ketone | (80) | Viton ® A | (20) | MT-908 | 27.0 | 27.0 | 46.0 | 0.29 | excellent |
| Y | methylethyl-ketone | (80) | Viton ® GF | (20) | MT-908 | 27.0 | 27.0 | 46.0 | 0.30 | excellent |

N.A. = not available

The particulate elastomeric composition of the present invention is useful in the preparation of power transmission belts, rocket insulating liners, seals, packing, gaskets, tank treads, tires, conveyor belts, hoses, wheels and many other uses.

What is claimed is:

1. Process for preparing a particulate elastomeric composition having a density ratio of 0.1 to 0.4 exclusive of any organic solvent which may be present whereby 10 to 60 parts of aramid pulp and 15 to 65 parts of reinforcing filler are thoroughly mixed, a solution of elastomer in an organic solvent is added with continued stirring, the quantity of solution being sufficient to provide 5 to 75 parts elastomer, all parts to add up to 100 parts exclusive of organic solvent, the elastomeric particles are removed.

2. The process of claim 1 wherein the aramid pulp is poly(p-phenylene terephthalamide)pulp.

3. The process of claim 2 wherein the pulp has a length of 0.5 4.0 mm.

4. The process of claim 1 wherein the elastomer is a fluoroelastomer.

5. The process of claim 1 wherein the elastomer is polychloroprene.

6. The process of claim 1 wherein the elastomer is chlorosulfonated polyethylene.

7. The process of claim 1 wherein the elastomer is an ethylene/propylene diene rubber.

8. The process of claim 1 wherein the elastomer is natural rubber.

9. The process of claim 1 wherein the elastomer is polyisoprene.

10. The process of claim 1 wherein the elastomer is an SBR.

11. The process of claim 1 wherein the elastomer is nitrile rubber.

12. The process of claim 1 wherein the elastomer is an ethylene-acrylic rubber.

13. The process of claim 1 wherein a solution of 20-30% by weight elastomer is used.

14. A particulate elastomeric composition produced by the process of claim 1 comprising, exclusive of any organic solvent which may be present, 5-75% by weight of an elastomer, 15-65% by weight of a reinforcing filler and 10-60% by weight of aramid pulp, said composition having a density ratio of 0.1 to 0.4 exclusive of any organic solvent which may be present.

15. The composition of claim 14 wherein the composition contains 10-50% by weight elastomer, 30-50% by weight reinforcing filler and 25-50% by weight pulp.

16. Process for preparing a reinforced elastomeric article wherein the particulate elastomeric composition of claim 14 is blended with the same or another elastomer using conventional rubber compounding techniques.

* * * * *